（12）United States Patent
Chang

(10) Patent No.: US 8,499,110 B2
(45) Date of Patent: Jul. 30, 2013

(54) METHOD OF GENERATING USEFUL ELECTROMAGNETIC WAVES BY CONTROLLING ELECTROMAGNETIC WAVE NOISE GENERATED FROM BUS WITHIN COMPUTER BY MEANS OF SOFTWARE

(75) Inventor: Byung Hwa Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 196 days.

(21) Appl. No.: 13/002,315

(22) PCT Filed: May 15, 2009

(86) PCT No.: PCT/KR2009/002584
§ 371 (c)(1),
(2), (4) Date: Dec. 31, 2010

(87) PCT Pub. No.: WO2010/030067
PCT Pub. Date: Mar. 18, 2010

(65) Prior Publication Data
US 2011/0161537 A1    Jun. 30, 2011

(30) Foreign Application Priority Data

Sep. 11, 2008    (KR) .................. 10-2008-0089991

(51) Int. Cl.
*G06F 13/42*    (2006.01)
*G06F 13/38*    (2006.01)
(52) U.S. Cl.
CPC .................................. *G06F 13/385* (2013.01)
USPC ....................................................... 710/105

(58) Field of Classification Search
USPC .................. 710/104–105, 305–306; 330/251, 330/295; 713/600
See application file for complete search history.

(56) References Cited

U.S. PATENT DOCUMENTS

| 5,675,832 | A * | 10/1997 | Ikami et al. ................... 713/600 |
| 6,721,423 | B1 | 4/2004 | Anderson et al. |
| 6,891,432 | B2 * | 5/2005 | Nagle et al. ................... 330/251 |
| 7,245,183 | B2 * | 7/2007 | Nagle et al. ................... 330/295 |

(Continued)

FOREIGN PATENT DOCUMENTS

JP    11096042 A    4/1999

(Continued)

OTHER PUBLICATIONS

International Search Report for PCT/KR2009/002584.

(Continued)

*Primary Examiner* — Raymond Phan
(74) *Attorney, Agent, or Firm* — LRK Patent Law Firm

(57) ABSTRACT

Provided is a method of generating electromagnetic waves using software. The method includes setting electromagnetic wave pattern data in consideration of a number of a bus (140, 150) connecting a central processing unit (CPU, 110) with a main memory (130) and transmission characteristics of the bus, storing the electromagnetic wave pattern data in a register of the CPU (110), setting an address in the main memory (130) at which the electromagnetic wave pattern data will be recorded, and transferring the electromagnetic wave pattern data to the set address in the main memory (130) through all the lines of the bus (140, 150). Here, electromagnetic waves corresponding to the electromagnetic wave pattern data are generated while the electromagnetic wave pattern data is transferred to the main memory through the bus.

8 Claims, 4 Drawing Sheets

FOREIGN PATENT DOCUMENTS

| | | |
|---|---|---|
| JP | 2000-187618 A | 7/2000 |
| JP | 2000-293254 A | 10/2000 |
| JP | 2001-142600 A | 5/2001 |
| JP | 2004-172664 A | 6/2004 |
| JP | 2005-045274 A | 2/2005 |
| KR | 20-0362792 Y1 | 9/2004 |
| KR | 10-2004-0111501 A | 12/2004 |
| WO | 2004-109560 A1 | 12/2004 |

OTHER PUBLICATIONS http://www.erikyyy.de/tempest.

Markus G. Kuhn et al., "Soft Tempest: Hidden Data Transmission Using Electromagnetic Emanations", David Aucsmith (Ed.): Information Hiding 1998, LNCS 1525, pp. 124-142, 1998, Cambridge, United Kingdom.

* cited by examiner

Electromagnetic waves(151)

Electromagnetic wave signal (340)

METHOD OF GENERATING USEFUL ELECTROMAGNETIC WAVES BY CONTROLLING ELECTROMAGNETIC WAVE NOISE GENERATED FROM BUS WITHIN COMPUTER BY MEANS OF SOFTWARE

TECHNICAL FIELD

The present invention relates to a method of generating electromagnetic waves using software, and more particularly, to a method of generating useful electromagnetic waves by controlling electromagnetic wave noise generated from a bus within a general-purpose computer using software.

BACKGROUND ART

Electromagnetic waves generated while a computer operates are induced by current flowing through a wire, etc., for an operation in the computer, and considered a side effect affecting precise operations. In general, chaotic noise signals are generated as such electromagnetic waves while signals are transferred through wires in the computer. In particular, due to increase in the operating speed of computers, the frequency of electromagnetic wave noise generated from the computers is gradually shifted to a high frequency signal band.

Meanwhile, with the development of personal computers (PCs), various methods and devices using a PC have been developed. Recently, several devices that are wirelessly rather than wiredly controlled by a computer have been developed.

However, to control such devices, a device capable of generating electromagnetic waves must be additionally connected with the computer.

To solve this problem, a method of generating electromagnetic waves having specific meaning by controlling electromagnetic wave noise generated from a PC using software has been needed.

DISCLOSURE OF INVENTION

Technical Problem

The present application is directed to providing a method of generating electromagnetic waves using software.

The present application is also directed to generating useful electromagnetic waves by controlling electromagnetic wave noise generated from a bus connecting a central processing unit (CPU) with a main memory using software.

Technical Solution

One aspect of the present invention provides a method of generating electromagnetic waves using software, comprising: setting electromagnetic wave pattern data in consideration of a number of lines of a bus connecting a central processing unit (CPU) with a main memory and transmission characteristics of the bus; storing the electromagnetic wave pattern data in a register of the CPU; setting an address in the main memory at which the electromagnetic wave pattern data will be recorded; and transferring the electromagnetic wave pattern data to the set address in the main memory through all the lines of the bus. Here, electromagnetic waves corresponding to the electromagnetic wave pattern data are generated while the electromagnetic wave pattern data is transferred to the main memory through the bus.

Another aspect of the present invention provides a method of generating electromagnetic waves using software, comprising: setting electromagnetic wave pattern data in consideration of a number of lines of a bus connecting a CPU with a main memory and transmission characteristics of the bus; storing the electromagnetic wave pattern data in the main memory; setting a register of the CPU in which the electromagnetic wave pattern data will be recorded; and transferring the electromagnetic wave pattern data to the set CPU register through all the lines of the bus. Here, electromagnetic waves corresponding to the electromagnetic wave pattern data are generated while the electromagnetic wave pattern data is transferred to the CPU register through the bus.

Advantageous Effects

Using a method of generating electromagnetic waves according to an exemplary embodiment of the present invention, it is possible to wirelessly issue a control command to various wireless receiving devices within a short distance without using any additional device in a general personal computer (PC), and to wirelessly provide information without aid of other devices using several modulation methods.

MODE FOR THE INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

Figure 1:
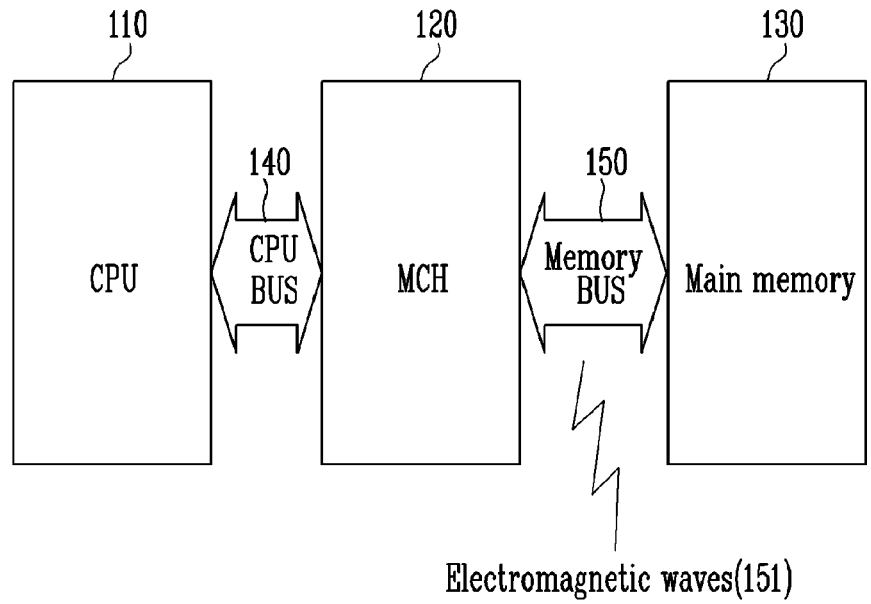
FIG. 1 is a diagram of the constitution of a personal computer (PC) illustrating generation of electromagnetic wave noise.

FIG. 1 is a diagram of the constitution of a personal computer (PC) illustrating generation of electromagnetic wave noise.

Referring to FIG. 1, a general PC includes a central processing unit (CPU) 110, a main memory 130 and a memory control hub (MCH) 120 transferring a signal generated from the CPU 110 to each part of the PC and the main memory 130. The CPU 110, the MCH 120 and the main memory 130 are connected through buses 140 and 150 to communicate with each other. For convenience, in the present invention, a bus connecting the CPU 110 with the MCH 120 is referred to as the CPU bus 140, and a bus connecting the main memory 130 and the MCH 120 is referred to as the memory bus 150.

Currents of several levels very intricately flow through the CPU bus 140 and the memory bus 150 according to operation of the PC, and thus electromagnetic fields are generated around the buses 140 and 150. The generated electromagnetic field becomes noise of electromagnetic waves 151, which is radiated outside the PC. Since complicated control signals pass through the CPU bus 140, the electromagnetic wave noise from the CPU bus 140 becomes very irregular. On the other hand, when the CPU 110 writes or reads data in or from the memory, the electromagnetic wave noise generated from the memory bus 150 becomes regular.

Such electromagnetic wave noise affects a processor of a computer or electronic devices around the computer, and thus is not useful but deteriorates performance in a conventional computing environment.

Figure 2:
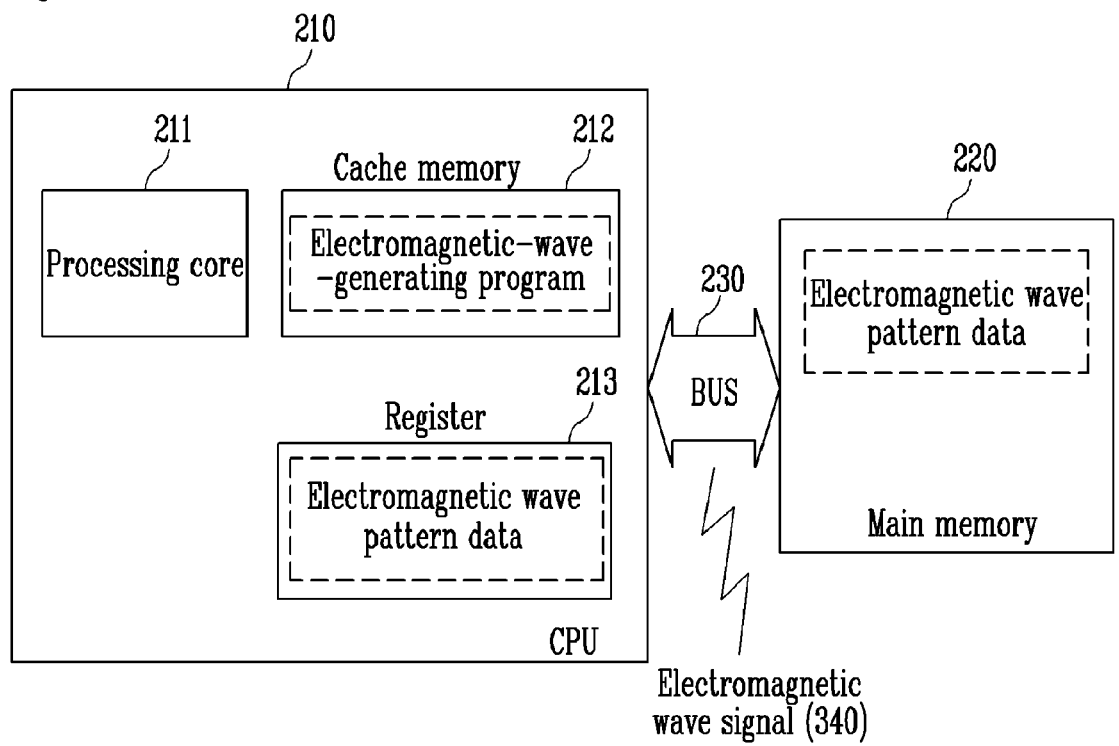
FIG. 2 is a conceptual diagram illustrating a process of generating electromagnetic waves using software according to an exemplary embodiment of the present invention.

FIG. 2 is a conceptual diagram illustrating a process of generating electromagnetic waves using software according to an exemplary embodiment of the present invention.

Electromagnetic wave noise is generated from a bus 230 when data is transferred between a CPU 210 and a main memory 220. A processing core 211 of the CPU 210 loads an electromagnetic-wave-generating program, which causes periodical change in current by transferring data between the CPU 210 and the main memory 220 to generate electromagnetic waves, into a cache memory 212 and executes the program.

More specifically, the electromagnetic-wave-generating program according to an exemplary embodiment of the present invention stores electromagnetic wave pattern data corresponding to a specific electromagnetic wave pattern in a register 213 within the CPU 210 and transfers the electromagnetic wave pattern data stored in the register 213 to a designated address in the main memory 220 through all lines of the bus 230, or reversely transfers the electromagnetic wave pattern data stored in the main memory 220 to the register 213 through all the lines of the bus 230, thereby generating electromagnetic waves having the specific pattern from the bus 230.

Since the execution speed of recent computer chips has exceeded gigahertz, it would be easy to generate periodical current more than several millions of times per second using such a program. In particular, PCs having an Intel Pentium processor or higher among late PCs have a sufficient cache included in the CPU, and thus can load the electromagnetic-wave-generating program into the cache memory 212. In an exemplary embodiment, when a double data rate synchronous dynamic random access memory (DDR-SDRAM) is used as the main memory 220, the writing speed of the main memory 220 may be high enough to generate electromagnetic waves having a frequency of several hundred megahertzs or more.

In addition, according to data values applied to the respective lines of the bus 230, directions of currents flowing through the respective lines are the same as or opposite to each other, and the currents are summed up or cancel each other. Thus, it is possible to adjust the total of the currents flowing through all the lines of the bus 230 using the electromagnetic wave pattern data. By adjusting the electromagnetic wave pattern data applied to the bus 230, a waveform of electromagnetic waves emitted to surroundings can be controlled, and an appropriately-modulated waveform can be generated.

For example, when the bus 230 has a width of sixty-four bits, electromagnetic wave pattern data having all sixty-four bits of "1" is applied to the bus 230 for five nanoseconds, and electromagnetic wave pattern data having all sixty-four bits of "0" is applied to the bus 230 for the next five nanoseconds. By repeating this operation, electromagnetic waves having a period of 10 nanoseconds, that is, 100 MHz electromagnetic waves are generated with the maximum intensity. In addition, when electromagnetic wave pattern data 50% of the bits of which are "1" instead of electromagnetic wave pattern data having all bits of "1" and electromagnetic wave pattern data 50% of the bits of which are "0" instead of electromagnetic wave pattern data having all bits of "0" is applied, the intensity of generated electromagnetic waves is equal to 0% of the maximum. This is because current generated by the electromagnetic wave pattern data 50% of the bits of which are "1" and current generated by the electromagnetic wave pattern data 50% of the bits of which are "0" cancel each other and current functioning to emit electromagnetic waves becomes 0. When electromagnetic wave pattern data 75% of the bits of which are "1" instead of electromagnetic wave pattern data having all bits values of 1 and electromagnetic wave pattern data 75% of the bits of which are "0" instead of electromagnetic wave pattern data having all bits values of 0 is applied, the intensity of generated electromagnetic waves is about 50% of the maximum. In this way, the intensity of generated electromagnetic waves can be controlled by adjusting electromagnetic wave pattern data applied to the bus 230, and various amplitude modulation methods such as amplitude modulation (AM) and amplitude-shift keying (ASK) can be implemented.

Figure 3:
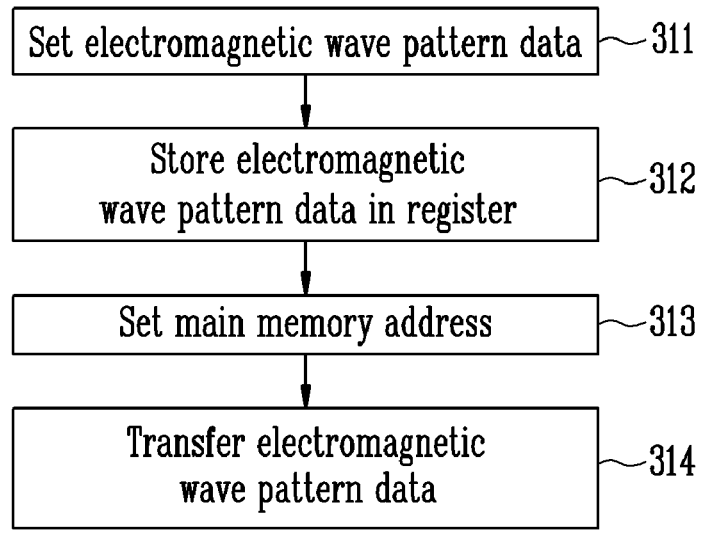
FIG. 3A is a flowchart showing a process of generating electromagnetic waves according to an exemplary embodiment of the present invention.
FIG. 3B illustrates an example of an electromagnetic-wave-generating program implemented on the basis of the flowchart of FIG. 3A.

FIG. 3A is a flowchart showing a process of generating electromagnetic waves according to an exemplary embodiment of the present invention, and FIG. 3B illustrates an example of an electromagnetic-wave-generating program implemented on the basis of the flowchart of FIG. 3A. More specifically, FIGS. 3A and 3B illustrate a process in which electromagnetic waves are generated while data is transferred from a CPU to a main memory through a bus.

Referring to FIG. 3A, first, electromagnetic wave pattern data is set in step 311. The electromagnetic wave pattern data is set in advance to generate a specific electromagnetic wave pattern in consideration of the number of lines that the bus can process in parallel and the transmission characteristics of the bus.

Subsequently, the electromagnetic wave pattern data is stored in a CPU register in step 312, and a main memory address at which the electromagnetic wave pattern data will be recorded is set in step 313.

Finally, the electromagnetic wave pattern data stored in the register is transferred to the main memory through the bus in step 314. While the electromagnetic wave pattern data is transferred to the main memory through the bus, voltage variation occurs, and thus electromagnetic waves may be generated.

Referring to the program of FIG. 3B, electromagnetic wave pattern data DATA_PATTERN is stored in XMM1 register (330), a main memory address START_ADDRESS at which the electromagnetic wave pattern data DATA_PATTERN will be stored is set (331), and a number LOOP_COUNTER of data transfer operations is set in ECX register (332). Then, the electromagnetic wave pattern data DATA_PATTERN stored in XMM1 register is transferred (334).

Subsequently, "16" is added to the memory address START_ADDRESS stored in EDX register to change the memory address START_ADDRESS at which the electromagnetic wave pattern data DATA_PATTERN will be stored (335), and transfer of the electromagnetic wave pattern data DATA_PATTERN is repeated as many times as the number LOOP_COUNTER of data transfer operations set in ECX register (336). By executing the program illustrated in FIG. 3B, electromagnetic waves of the specific pattern are generated while the electromagnetic wave pattern data is transferred from the CPU register to the main memory.

Figure 4:
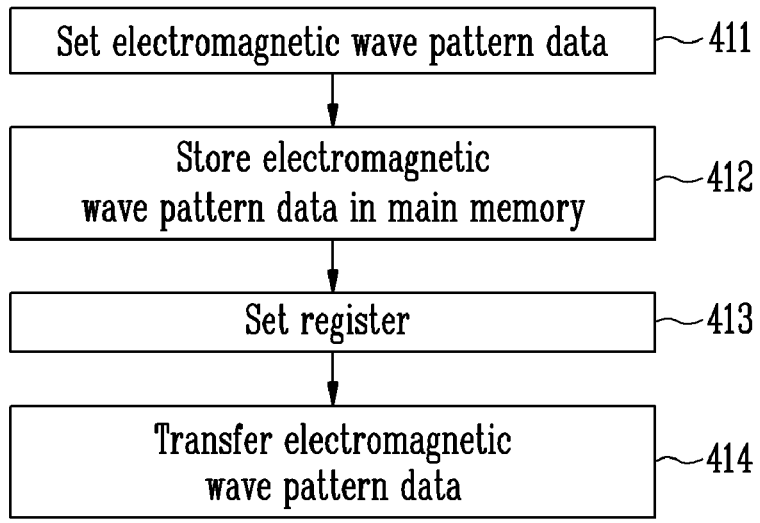
FIG. 4A is a flowchart showing a process of generating electromagnetic waves according to another exemplary embodiment of the present invention.
FIG. 4B illustrates an example of an electromagnetic-wave-generating program implemented on the basis of the flowchart of FIG. 4A.

FIG. 4A is a flowchart showing a process of generating electromagnetic waves according to another exemplary embodiment of the present invention, and FIG. 4B illustrates an example of an electromagnetic-wave-generating program implemented on the basis of the flowchart of FIG. 4A. More specifically, FIGS. 4A and 4B illustrate a process in which electromagnetic waves are generated while data is transferred from a main memory to a CPU through a bus.

Referring to FIG. 4A, first, electromagnetic wave pattern data is set (step 411), and the set electromagnetic wave pattern data is stored in the main memory (step 412). Then, a register of the CPU in which the electromagnetic wave pattern data will be stored is set (step 413), and the electromagnetic wave pattern data stored in the main memory is transferred to the register in the CPU through the bus (step 414). While the electromagnetic wave pattern data is transferred to the CPU through the bus, voltage variation occurs, and thus electromagnetic waves may be generated.

Referring to the program of FIG. 4B, a main memory address START_ADDRESS at which electromagnetic wave pattern data is stored is set in EDX register (431), and a number LOOP_COUNTER of data transfer operations is set in ECX register (432). Then, the electromagnetic wave pattern data is read from the main memory address START_ADDRESS stored in EDX register and is transferred to XMM1 register (434).

Subsequently, "16" is added to the memory address START_ADDRESS stored in EDX register to change the memory address START_ADDRESS at which the electromagnetic wave pattern data DATA_PATTERN is stored (435), and transfer of the electromagnetic wave pattern data DATA_PATTERN is repeated as many times as the number LOOP_COUNTER of data transfer operations set in ECX register (436).

By executing the program illustrated in FIG. 4B, electromagnetic waves of a specific pattern are generated while the electromagnetic wave pattern data is transferred from the main memory to the CPU register.

In order to generate electromagnetic waves by executing the program codes illustrated in FIGS. 3B and 4B, a few conditions need to be met.

First, the program codes must be loaded into the cache of a CPU and executed. When a program stored in a main memory is frequently read the program codes and the electromagnetic wave pattern data transferred through a bus are mixed, and it is difficult to generate electromagnetic waves of a desired waveform.

Second, electromagnetic wave pattern data must be actually transferred between a CPU and a main memory through a bus. Although electromagnetic wave pattern data is transferred by a program, it may be transferred to the cache of the CPU and may not be transferred through the memory bus. The CPU generally prevents itself from communicating with the main memory. Thus, when an amount of pattern data to be written is smaller than the cache size of the CPU, the CPU does not transfer the data to the main memory but stores the data in its cache, and performs a next command.

Third, a speed at which a CPU records electromagnetic wave pattern data in a main memory must be higher than the maximum recording speed of the main memory. Otherwise, transferring of data through a bus is not continuous, and electromagnetic waves may be intermittently generated.

Finally, the program must be executed without interruption. Windows, which is an operating system widely used for a general PC, has a thread switching function to improve a multitasking capability. When the thread switching function is used while the program is executed, generation of electromagnetic waves may be stopped.

Electromagnetic waves generated when the third and fourth conditions are not met have an intermittent waveform. Even in this case, it is possible to safely transfer information by appropriately designing a communication method.

Figure 5:
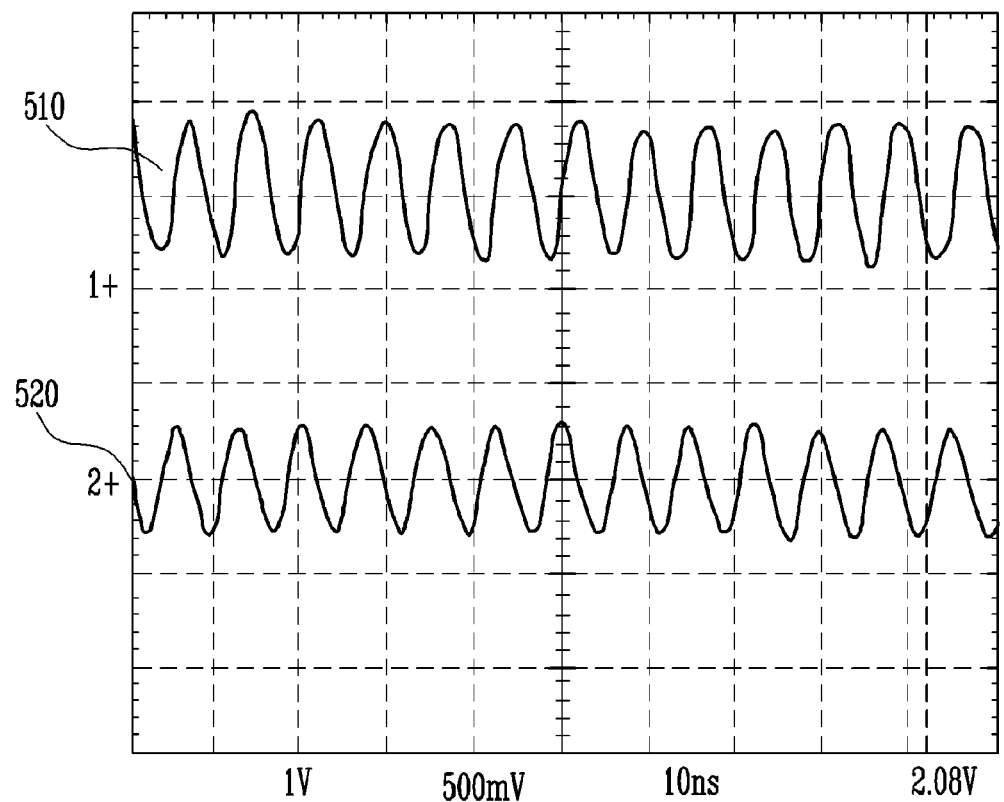
FIG. 5 illustrates electromagnetic waves generated using a program according to an exemplary embodiment of the present invention.

FIG. 5 illustrates electromagnetic waves generated using a program according to an exemplary embodiment of the present invention.

FIG. 5 shows electromagnetic waves generated by the program according to an exemplary embodiment of the present invention, in case that a DDR memory clock frequency of a computer is 133 MHz and a bus has a width of sixty-four bits. In FIG. 5, reference number 510 indicates a voltage variation measured in a memory bus, and reference number 520 indicates the waveform of the loop antenna voltage induced by electromagnetic waves.

Such electromagnetic waves are generated as follows. Electromagnetic wave pattern data (FFFFFFFFFFFFFFFF0000000000000000) having upper sixty-four bits of "1" and lower sixty-four bits of "0" is set in XMM1 register according to the program illustrated in FIG. 3B. Then, the upper sixty-four bits and the lower sixty-four bits are transferred in sequence because the size of XMM1 register is double the width of the bus.

Therefore, high voltage is applied to all bus lines while the upper sixty-four bits of the electromagnetic wave pattern data are transferred from XMM1 register to a main memory, and low voltage is applied to all the bus lines while the lower sixty-four bits of the electromagnetic wave pattern data are transferred to the main memory. When the values are repeatedly transferred to the bus, the voltage variation 510 occurs in the bus, and thus electromagnetic waves are generated.

Figure 6:
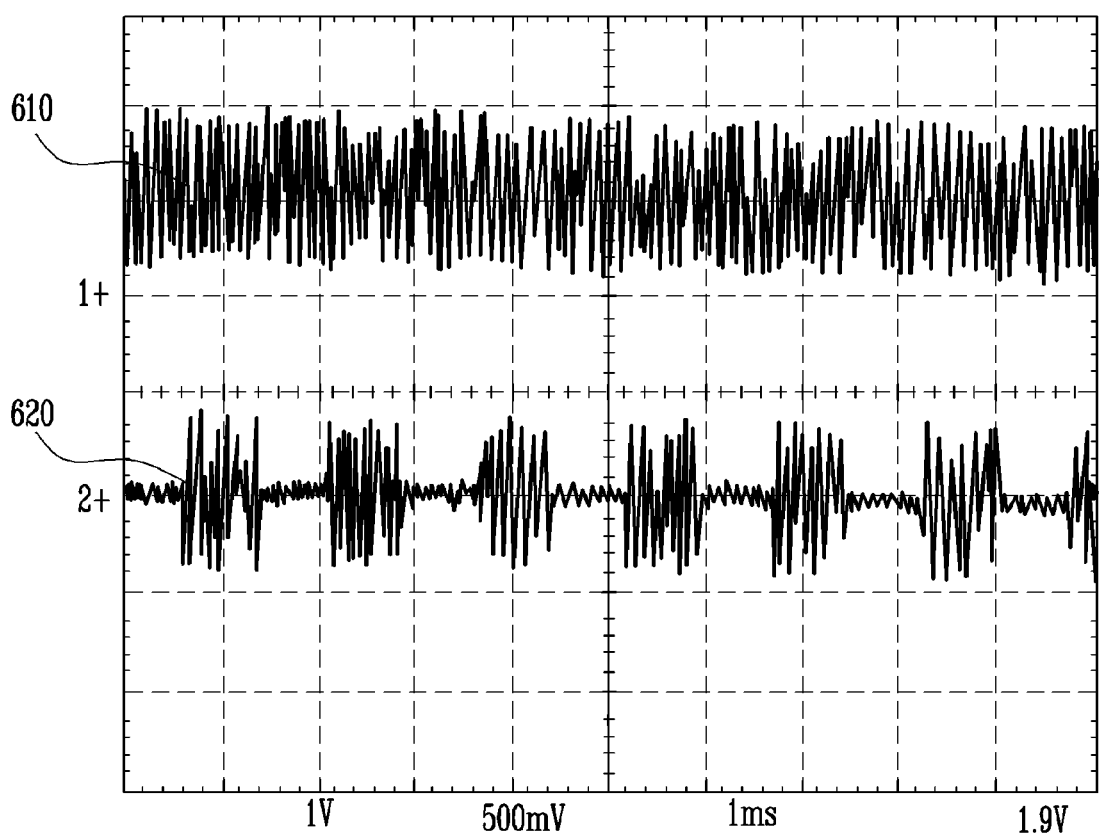
FIG. 6 illustrates amplitude modulation (AM) waves generated using a program according to an exemplary embodiment of the present invention.

FIG. 6 illustrates amplitude-modulated (AM) waves generated using a program according to an exemplary embodiment of the present invention. They were generated when a DDR memory clock frequency of a computer is 133 MHz and a bus has a width of sixty-four bits. In FIG. 6, reference number 610 indicates the same waveform as reference number 510 of FIG. 5 generated using the fixed electromagnetic wave pattern data in the program. Due to characteristics of a digital oscilloscope, the waveform 610 is shown to be different from the waveform 510. The waveform 610 may be shown to be the same as the waveform 510 by enlarging scales of a time axis. Reference number 620 indicates AM waves generated by periodically changing the electromagnetic wave pattern data in the program.

The AM waves are generated as follows. Electromagnetic wave pattern data (FFFFFFFFFFFFFFFF0000000000000000) having upper sixty-four bits of "1" and lower sixty-four bits of "0" is set in XMM1 register for 750 microseconds. Then, electromagnetic wave pattern data (AAAAAAAAAAAAAAAA5555555555555555) having upper sixty-four bits of "1010 . . . " and lower sixty-four bits of "0101 . . . " is set in XMM1 register for the next 750 microseconds. By repeating these operations, electromagnetic waves are generated with the maximum intensity for 750 microseconds and no intensity for 750 microseconds, which is a waveform obtained by amplitude-modulating a 667 Hz square wave. The frequency of a generated high-frequency signal is the same as the clock frequency of the DDR memory, that is, 133 MHz, and thus the signal can be received by a common very high frequency (VHF) receiver. The 667 Hz tone can be audible using a VHF AM radio receiver at the frequency band of 133 MHz or its odd harmonics.

The above-described present invention can be implemented in at least one computer-readable recording medium. For example, the computer-readable recording medium may include a floppy disk, a hard disk, a compact disk read-only memory (CD-ROM), a flash memory card, a programmable read-only memory (PROM), a random-access memory (RAM), a read-only memory (ROM), or a magnetic tape. In general, a computer-readable program can be written in any programming language.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of generating electromagnetic waves using software which is recorded on a computer-readable recording medium, the method executed on one or more processors and comprising:
    setting electromagnetic wave pattern data in consideration of a number of lines of a bus connecting a central processing unit (CPU) with a main memory and transmission characteristics of the bus;
    storing the electromagnetic wave pattern data in a register of the CPU;
    setting an address in the main memory at which the electromagnetic wave pattern data will be recorded; and
    transferring the electromagnetic wave pattern data to the set address in the main memory through all the lines of the bus,
    wherein electromagnetic waves corresponding to the electromagnetic wave pattern data are generated while the electromagnetic wave pattern data is transferred to the main memory through the bus.

2. The method of claim 1, further comprising:
    periodically changing the electromagnetic wave pattern data to adjust a waveform of the electromagnetic waves.

3. The method of claim 1, wherein a ratio of "1" bits and "0" bits constituting the electromagnetic wave pattern data is adjusted to control an amplitude of the electromagnetic waves.

4. The method of claim 1, further comprising:
    setting a number of times of transfer of the electromagnetic wave pattern data.

5. A method of generating electromagnetic waves using software which is recorded on a computer-readable recording medium, the method executed on one or more processors and, comprising:
    setting electromagnetic wave pattern data in consideration of a number of lines of a bus connecting a central processing unit (CPU) with a main memory and transmission characteristics of the bus;
    storing the electromagnetic wave pattern data in the main memory;
    setting a register of the CPU in which the electromagnetic wave pattern data will be recorded; and
    transferring the electromagnetic wave pattern data to the set CPU register through all the lines of the bus,
    wherein electromagnetic waves corresponding to the electromagnetic wave pattern data are generated while the electromagnetic wave pattern data is transferred to the CPU register through the bus.

6. The method of claim 5, further comprising:
    periodically changing the electromagnetic wave pattern data to adjust a waveform of the electromagnetic waves.

7. The method of claim 5, wherein a ratio of "1" bits and "0" bits constituting the electromagnetic wave pattern data is adjusted to control an amplitude of the electromagnetic waves.

8. The method of claim 5, further comprising:
    setting a number of times of transfer of the electromagnetic wave pattern data.

* * * * *